United States Patent
Glaser et al.

(10) Patent No.: US 12,234,684 B2
(45) Date of Patent: Feb. 25, 2025

(54) SLIDING GLASS DOOR WEDGE

(71) Applicant: Todd Michael Glaser, Miami Beach, FL (US)

(72) Inventors: Todd Michael Glaser, Miami Beach, FL (US); Mark Fisher, Bal Harbour, FL (US); Ronald Simkins, Miami, FL (US); David Kreps, Miami Beach, FL (US); Werner Blumenthal, Miami, FL (US)

(73) Assignee: STORM SHIELD OF MIAMI, INC., Miami, FL (US)

( * ) Notice: Subject to any disclaimer, the term of this patent is extended or adjusted under 35 U.S.C. 154(b) by 416 days.

(21) Appl. No.: 17/428,113

(22) PCT Filed: Jan. 7, 2021

(86) PCT No.: PCT/US2021/012414
§ 371 (c)(1),
(2) Date: Aug. 3, 2021

(87) PCT Pub. No.: WO2022/150038
PCT Pub. Date: Jul. 14, 2022

(65) Prior Publication Data
US 2023/0160255 A1  May 25, 2023

(51) Int. Cl.
*E06B 7/26* (2006.01)
*F16B 47/00* (2006.01)

(52) U.S. Cl.
CPC ............... *E06B 7/26* (2013.01); *F16B 47/00* (2013.01)

(58) Field of Classification Search
CPC . E06B 5/003; E06B 7/26; E06B 3/301; E06B 3/308; E06B 3/4636; E06B 3/7001; F16B 47/00
USPC .......................................................... 52/97
See application file for complete search history.

(56) References Cited

U.S. PATENT DOCUMENTS

| | | | | |
|---|---|---|---|---|
| 3,791,074 A * | 2/1974 | Waffenschmidt | ......... | E06B 3/02 16/242 |
| 4,692,961 A * | 9/1987 | Brown | ...................... | E06B 9/00 49/476.1 |
| 5,495,884 A * | 3/1996 | Shikler | .................... | B60J 1/208 248/205.5 |
| 6,155,009 A * | 12/2000 | Pena | ........................ | E06B 9/02 52/171.3 |
| 2019/0048649 A1* | 2/2019 | Koenitz | .................... | E06B 1/32 |

* cited by examiner

*Primary Examiner* — Mark R Wendell
(74) *Attorney, Agent, or Firm* — Roberto M. Suárez, Esq.

(57) ABSTRACT

A rain deflector apparatus provides a declined body surface to deflect water away from a sliding glass door (or similar structure) and a compliant base portion that can be sealably inserted into the sliding glass door's track (or similar structure) in order to prevent water and debris from collecting in the track and making its way under the door. In a preferred embodiment, the rain deflector apparatus is secured to the glass of the sliding glass door by way of one or more suction cups. The suction cups are selected such that their holding force to the glass is sufficient to keep the upper edge of the apparatus pressed up against the glass and the lower edge in sealed relation to the track or floor.

4 Claims, 21 Drawing Sheets

100

100

100

100

100

SEE DETAIL FIG. 11

SEE DETAIL

1100

1200

SLIDING GLASS DOOR WEDGE

CROSS-REFERENCE TO RELATED APPLICATIONS

This application is submitted under 35 U.S.C. 371 as a US National Stage Entry of PCT/US21/12414, filed on Jan. 7, 2021, which is incorporated by reference herein in its entirety.

FIELD OF THE INVENTION

The present invention generally relates to rain deflectors and more specifically, to an apparatus, system, and related method using an improved sliding door wedge to deflect water and prevent flooding under a sliding glass door.

BACKGROUND OF THE INVENTION

It is a known issue with sliding glass doors that, due to the nature of their design to run in a track, water can accumulate within the track. Although sliding door tracks are generally designed with "weep holes" to allow water to drain out to the exterior of the structure, in adverse conditions the weep holes may become obstructed with debris thereby permitting the track to fill with water, seep under the sliding door and into the interior of the structure. In other scenarios, rainwater may be driven under the sliding glass door panel by forceful winds.

It is not always possible to design a structure where the sliding glass door is under a sufficient overhang to avoid rain and wind effects. In other situations, it is not convenient, nor advisable, to utilize known water diversion means, such as sandbags, since even a minor hole or tear in the sandbag could fill the track with sand—resulting in an undesirable mess within the track.

It is also known in the art to use a wedge-like device to prevent flooding under sliding patio doors by blocking the space between a bottom of a sliding door panel and the top of the sliding door track, as is disclosed in commonly-owned U.S. Pat. No. 10,428,578 for "Device for preventing flooding in sliding patio doors." However, this solution requires the use of a heavy material that is shapeable so that the weight of the device itself creates a sealing surface to the track and prevents the device from being blown away in strong winds.

It would be advantageous, then, to have a device that provides the advantages of deflecting water from accumulating in the track of a sliding glass door, while also being lightweight and easy to use. It would also be advantageous to have such a device that also permits the sliding glass door to be opened and closed without having to go outside or remove the device. Additionally, it would be advantageous to have a device of this sort that further does not employ sandbags or similar heavy, yet pliable, means that could damage the smooth functioning of the track.

SUMMARY OF THE INVENTION

As discussed above, commonly-owned U.S. Pat. No. 10,428,578 for "Device for preventing flooding in sliding patio doors," discloses a wedge-like device to prevent flooding under sliding patio doors by blocking the space between a bottom of a sliding door panel and the top of the sliding door track. We disclose here an improvement to the device disclosed in U.S. Pat. No. 10,428,578 that is lightweight, easy to use, and does not employ sandbags or similar bagged particulate to achieve a conforming seal.

We disclose a rain deflector apparatus that provides a declined body surface to deflect water away from a sliding glass door (or similar structure) and a compliant base portion that can be sealably inserted into the sliding glass door's track in order to prevent water and debris from collecting in the track and making its way under the door. Alternatively, the apparatus can be installed such that the compliant base portion is positioned on the floor just outside of the track. In a preferred embodiment, the rain deflector apparatus is secured to the glass of the sliding glass door by way of one or more suction cups and/or one or more magnets. The suction cups and/or magnets are selected such that their holding force to the glass is sufficient to keep the upper edge of the apparatus pressed up against the glass and the lower edge in substantially sealed relation to the track or floor.

Other features that are considered as characteristic for the invention are set forth in the drawings and preferred embodiment.

Although the invention is illustrated and described herein as embodied in a device for preventing flooding through a sliding patio door, the invention should not be limited to the details shown in those embodiments because various modifications and structural changes may be made without departing from the spirit and scope of the invention. Furthermore, while the invention is described within the context of a sliding glass door, one of ordinary skill in the art will realize that the invention may be sized and configured as appropriate for other applications such as windows and other similar structures.

The construction and method of operation of the invention and additional objects and advantages of the invention are best understood from the following description of specific embodiments when read in connection with the accompanying drawings.

BRIEF DESCRIPTION OF THE DRAWINGS

In the accompanying figures, like reference numerals refer to identical or functionally similar elements throughout the separate views. The accompanying figures, together with the detailed description below, are incorporated in and form part of the specification and serve to further illustrate various embodiments and to explain various principles and advantages all in accordance with the present invention, in which.

Figure 1:
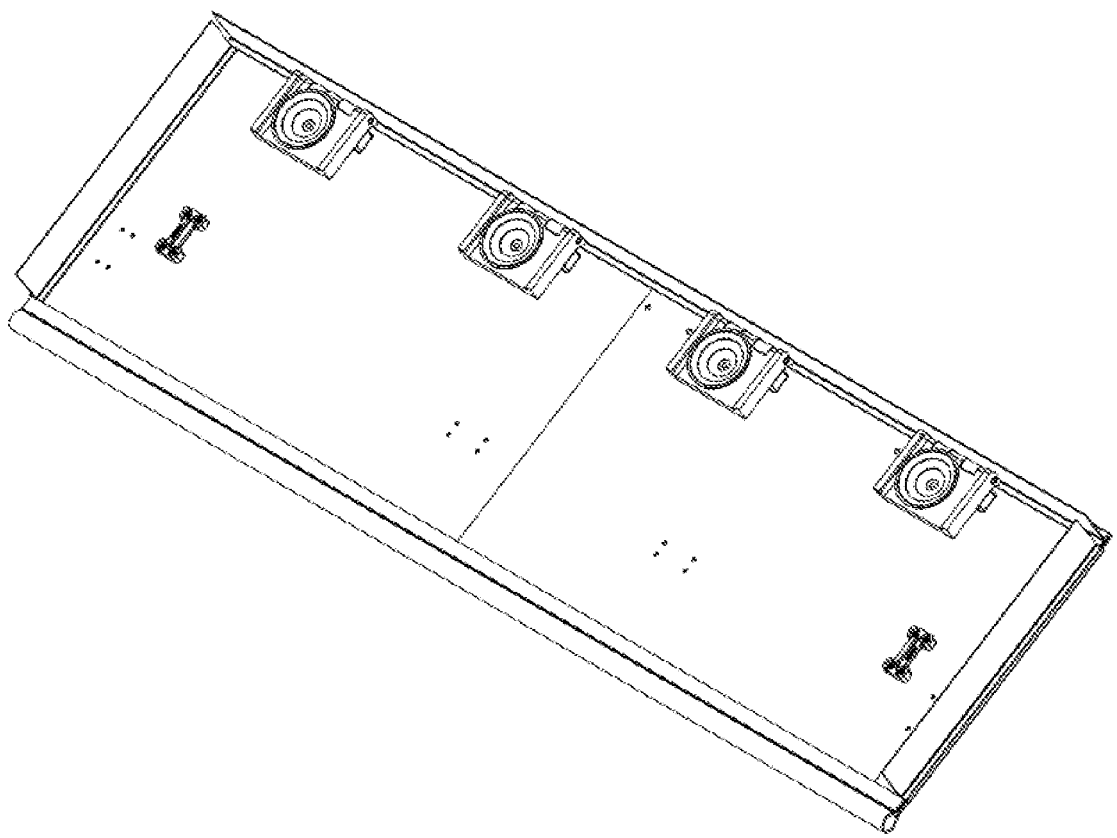
FIG. 1 shows an isometric view according to an embodiment of the present invention.
Figure 2:
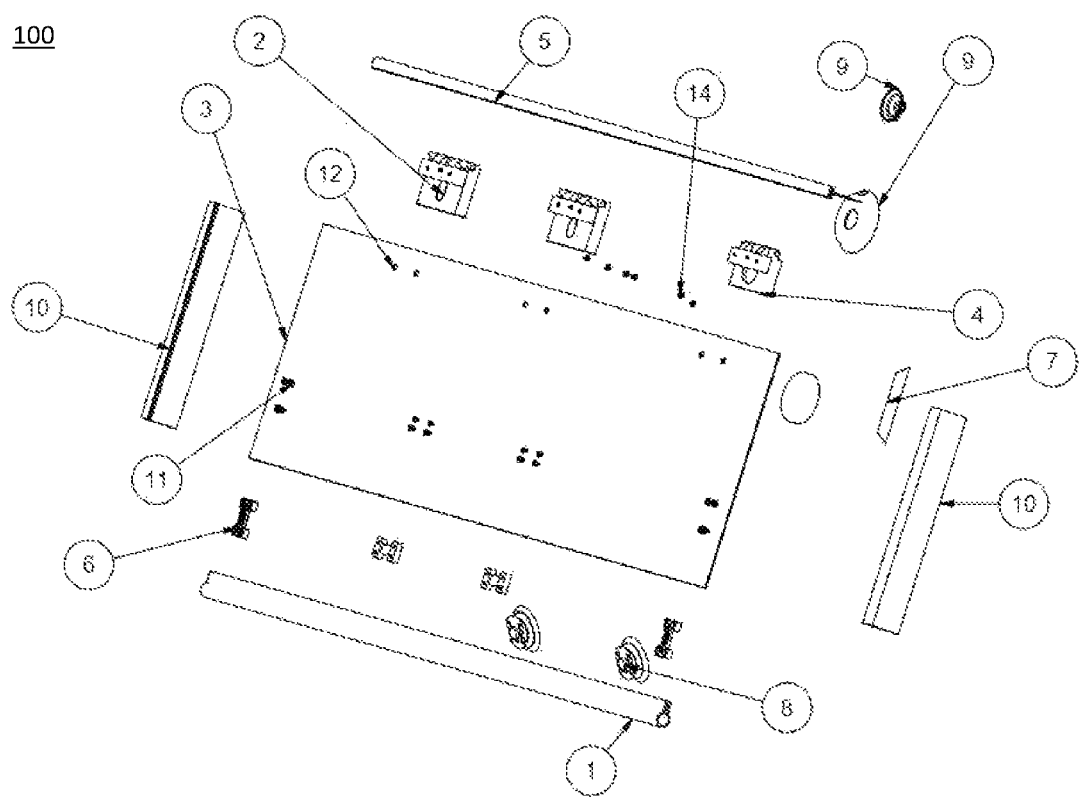
FIG. 2 shows an exploded view of the invention shown in FIG. 1.
Figure 3:
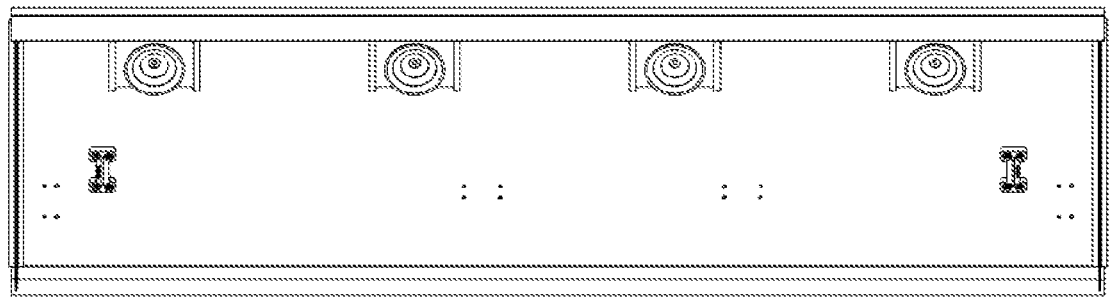
FIG. 3 shows a top view of the invention shown in FIG. 1.
Figure 4:
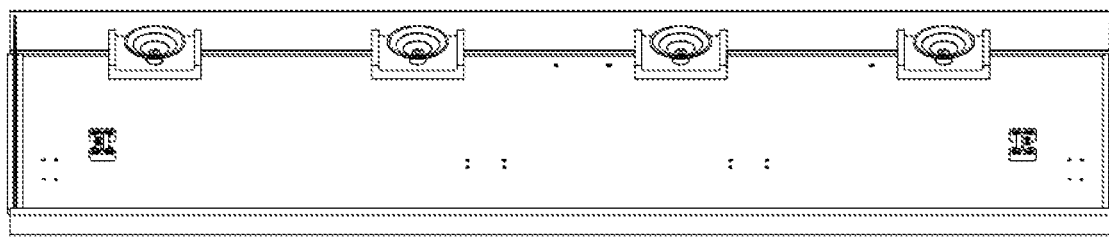
FIG. 4 shows a front view of the invention shown in FIG. 1.
Figure 5:
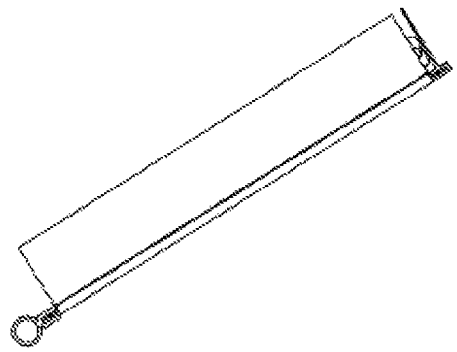
FIG. 5 shows a right view of the invention shown in FIG. 1.
Figure 6:
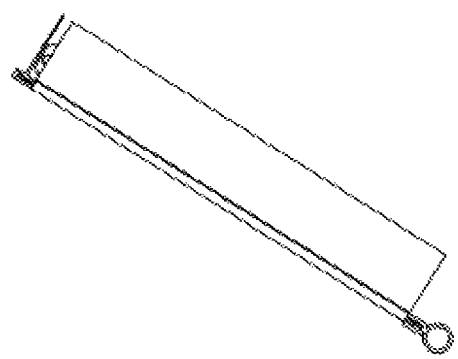
FIG. 6 shows a left view of the invention shown in FIG. 1.
Figure 7:
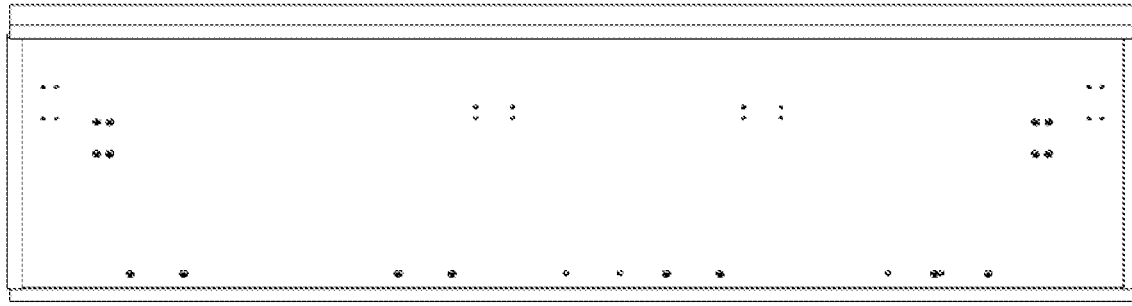
FIG. 7 shows a bottom view of the invention shown in FIG. 1.
Figure 8:
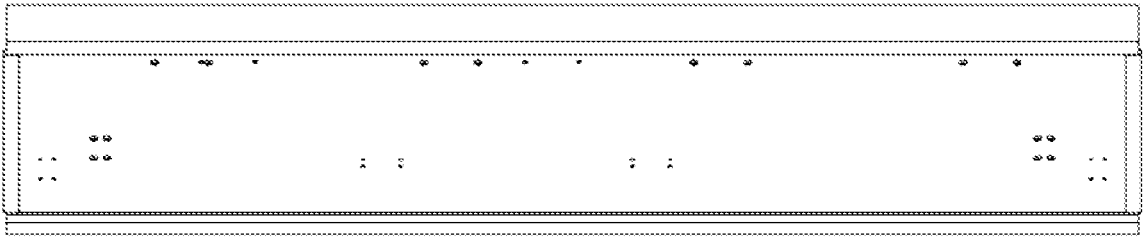
FIG. 8 shows a back view of the invention shown in FIG. 1.
Figure 9:
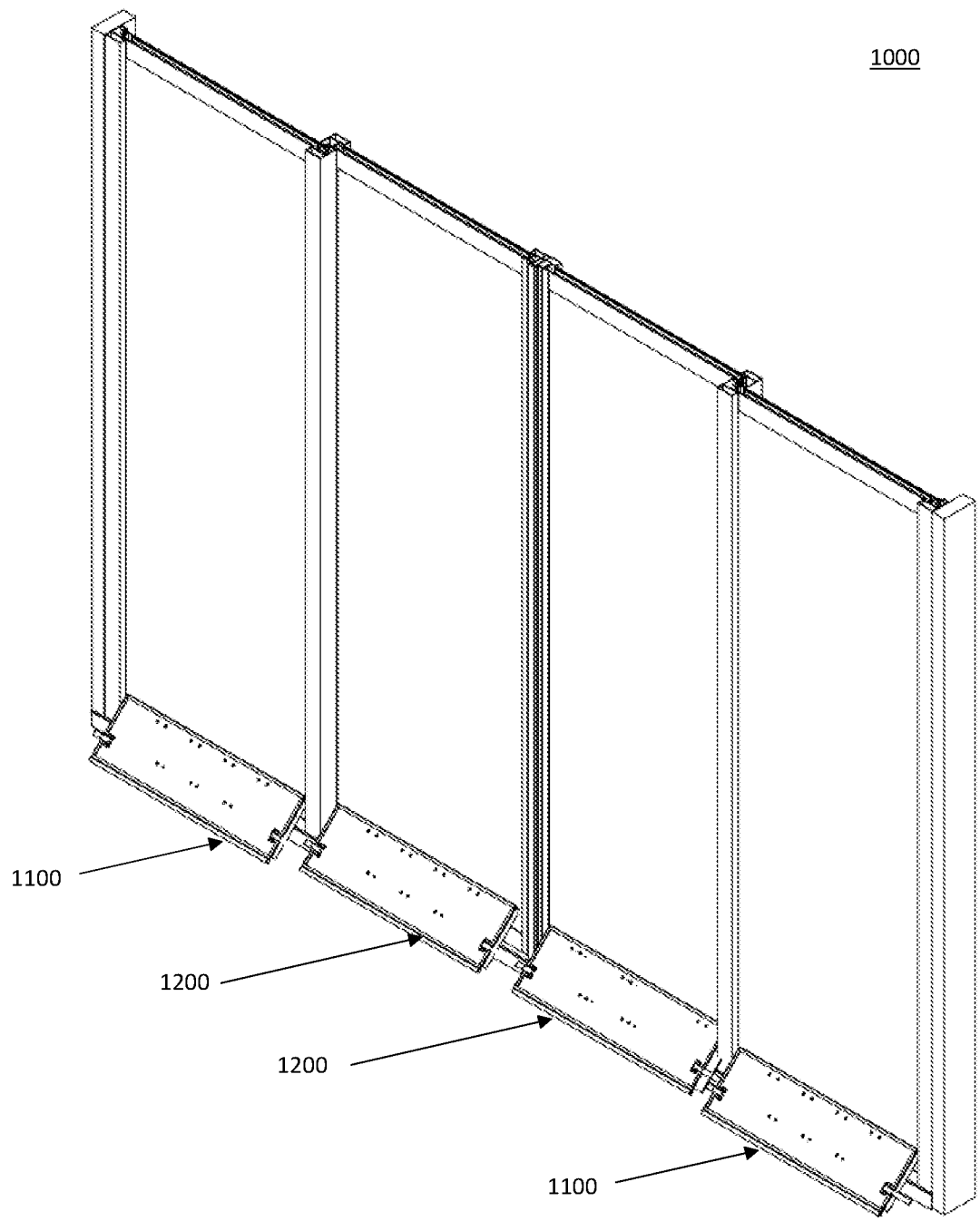
FIG. 9 shows an isometric view of a system embodiment of the invention in the closed state.
Figure 10:
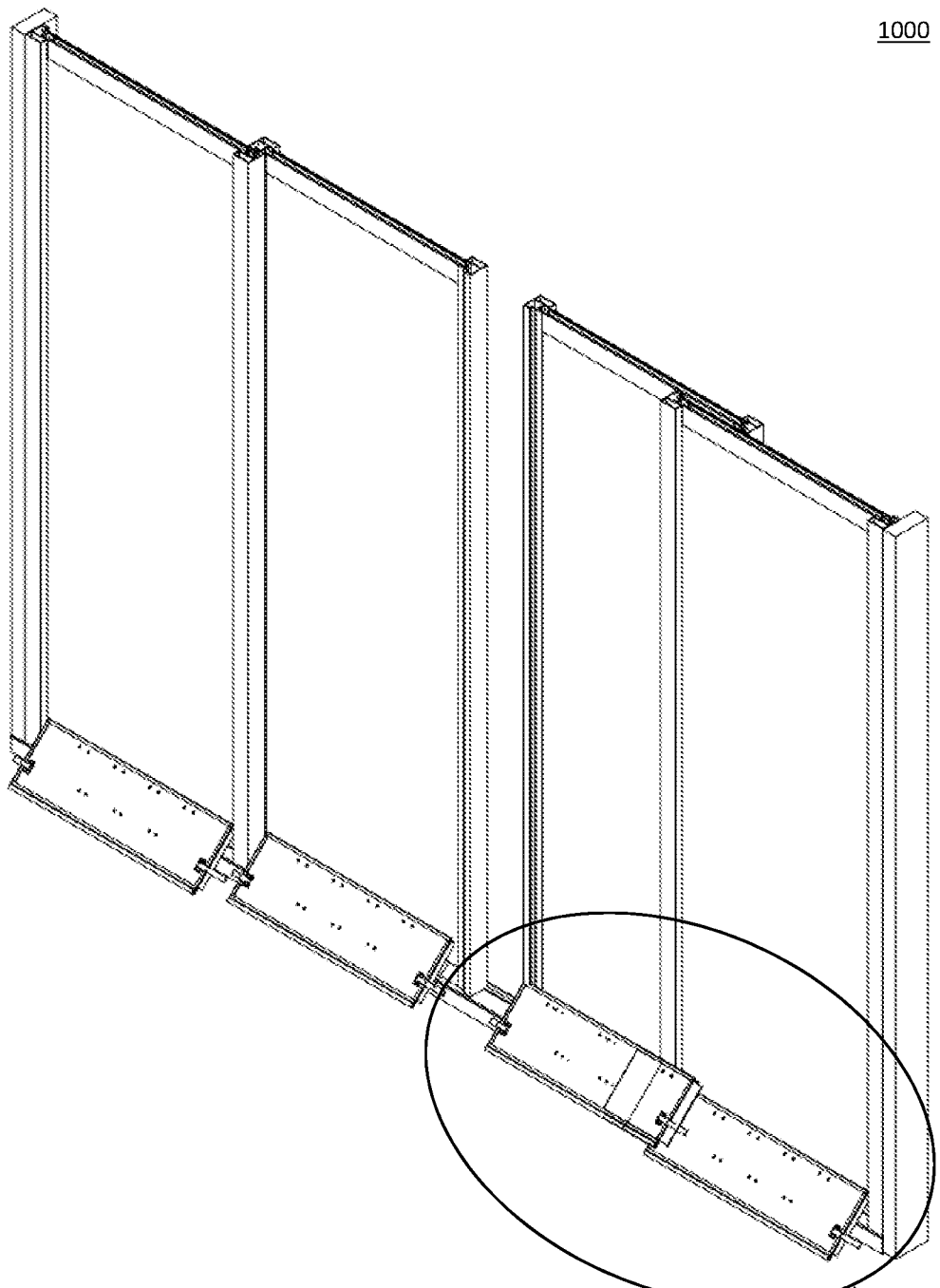
FIG. 10 shows an isometric view of a system embodiment of the invention shown in FIG. 9 in the open state.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

We disclose an inventive rain deflector that is an improvement over the prior art. The inventive rain deflector may be used singly, or in combination with multiple panels as needed to correspond to the number of glass panels in the sliding glass door, window, or other structure. Throughout this disclosure, we also refer to the inventive rain deflector as a static deflector or a mobile deflector. This nomenclature corresponds with multi-panel sliding glass doors where, for example, one door slides (mobile) while the other door is stationary (static). In other sliding glass door systems there may be multiple "mobile" doors and this disclosure contemplates all of those varied combinations.

Also, throughout the present disclosure, the word "seal," and grammatical equivalents thereof, is used to express the mating of a non-rigid, or semi-rigid, structure to a rigid structure. The object of the current invention is to deflect as much water as possible from the track of the sliding glass door, but, especially in storms with high winds, it may not be possible to create a perfect seal to keep all of the water out.

Referring now to the figures, we disclose a preferred embodiment of a rain deflector 100, according to the invention. Rain deflector 100 is comprised of a substantially flat main body 3, having a front, back, and four edges. On each of the four edges is attached a compliant seal. Bottom seal 1 is configured to be sealably engaged within, or adjacent to, a sliding glass door track once installed on a sliding glass door that rides in the track. The side seals 10 and the top seal 5 are configured to be sealably engaged with the surface (glass and/or frame) of the sliding glass door. In some embodiments, the side seals 10 are omitted to better suit the sliding door geometry, but still remains within the scope of the present invention.

The main body 3 of the rain deflector 100 is preferably made of water- and weather-proof material that can withstand the harsh outdoor environments within which the invention is disclosed to operate. Materials, such as polypropylene, are preferred for their material properties including high impact resistance and high strength to weight ratio. Preferably, the material for the main body 3 should present enough rigidity in height so as to not buckle under its own weight, but also offer flexibility along its length (especially in the mobile panel version as described below).

The rain deflector 100 is removeably attachable to a sliding glass door via a plurality of suction cups 8 that are disposed on the main body 3. These suction cups 8 are preferably disposed near the top edge of the main body 3, distal from the bottom seal 10. Each of the suction cups 8 may be mounted to the main body 3 at a fixed angle. In this way a fixed separation may be maintained between the sliding door glass surface and the bottom seal 1. In other embodiments, each of the plurality of suction cups 8 may be mounted to the main body 3 via a mount 2 that is configurable with an adjustable or hinged angle. As shown in FIG. 1, the suction cup mount is comprised of a hinged component with one portion fixedly attached to the main body 3 and a hinged portion with a suction cup 8 fixedly attached thereto. In this way, the angle between the apparatus 100 and the sliding glass door is selectable by the user at the time of installation.

Figure 15:
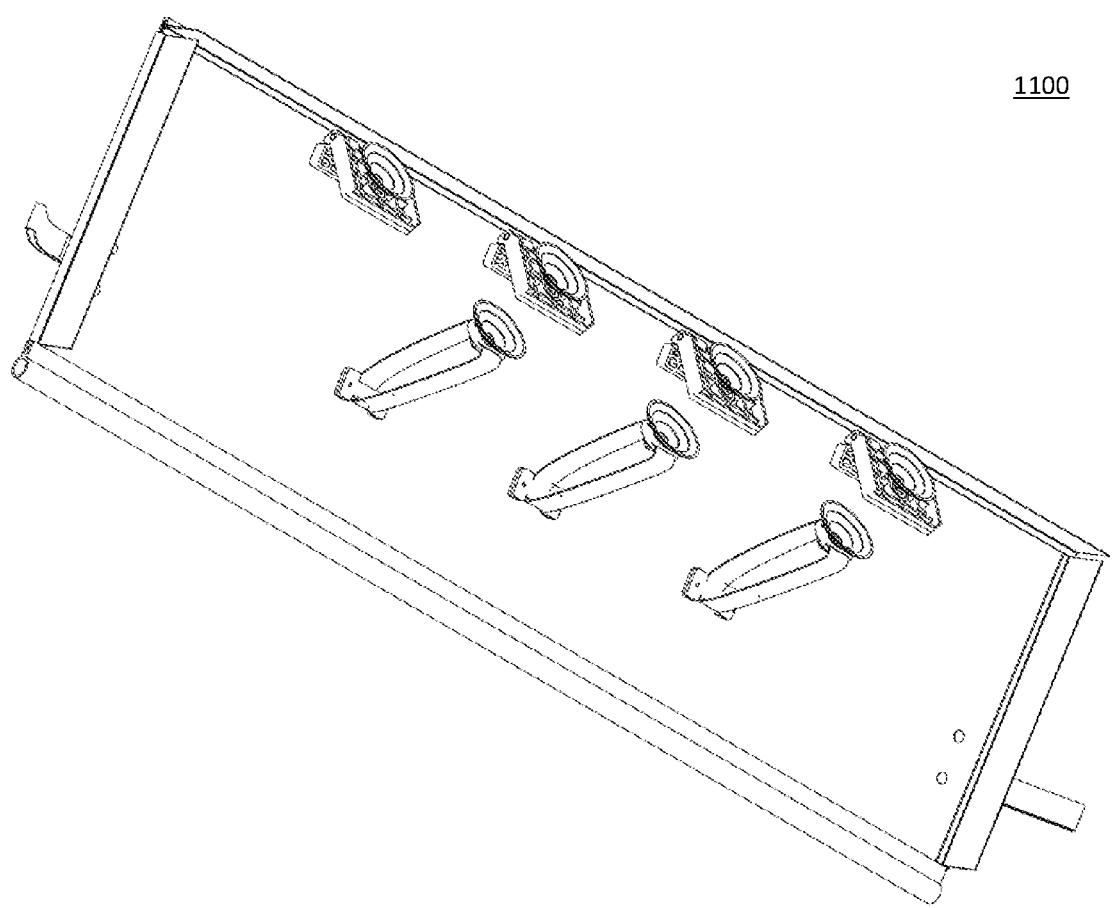
FIG. 15 shows an isometric view of a static panel according to an embodiment of the present invention.
Figure 16:
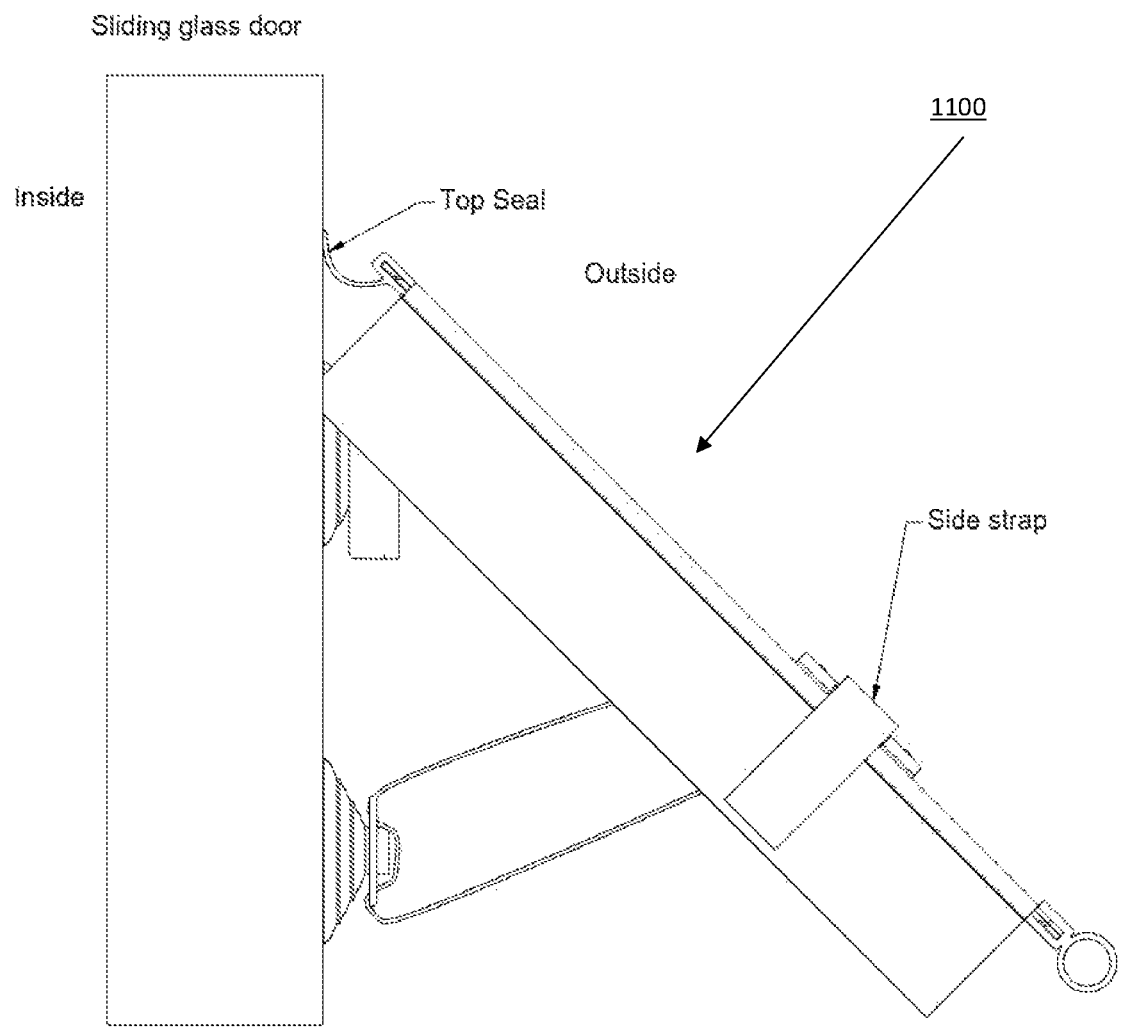
FIG. 16 shows a side view of the static panel shown in FIG. 15 as installed on a sliding glass door.
Figure 17:
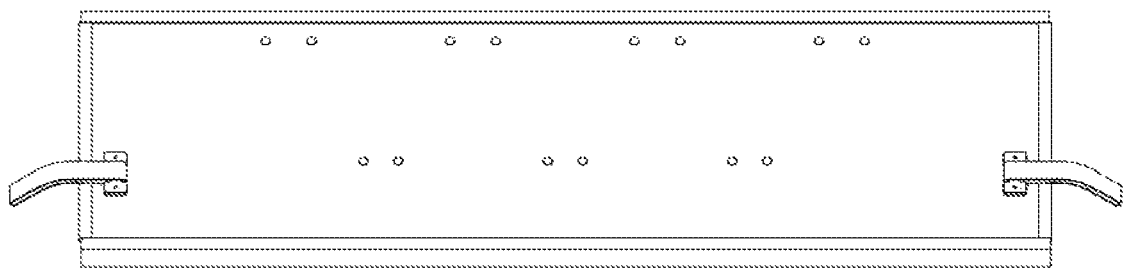
FIG. 17 shows a front view of the static panel shown in FIG. 15.

Another embodiment of the "static" panel 1100 is shown in FIGS. 15 and 17. A simplified depiction of static panel 1100 is shown in FIG. 16. In this embodiment, the top row of suction cups 8 is fixed to the outside of the sliding glass door and the lower row of suction cups 8 is attached to the main body panel via flexible straps. These straps are adjustable in length in order to control the angle of the panel 1100 and consequently the compression of the bottom seal 1 to the floor.

As described, above, rain deflector 100 or panel 1100 would be used as a "static" panel. Once installed on a static door, the suction cups 8 are not "accessible" from the inside and, therefore, this static panel 1100 would not move. In the case of installation on a mobile door that is configured to slide back and forth relative to the static door, a static panel 1100 could be installed—and work just as well—however, once installed, the mobile door would not be able to be opened due to the presence of the static panel 1100. In this case a mobile panel embodiment is preferred.

Figure 18:
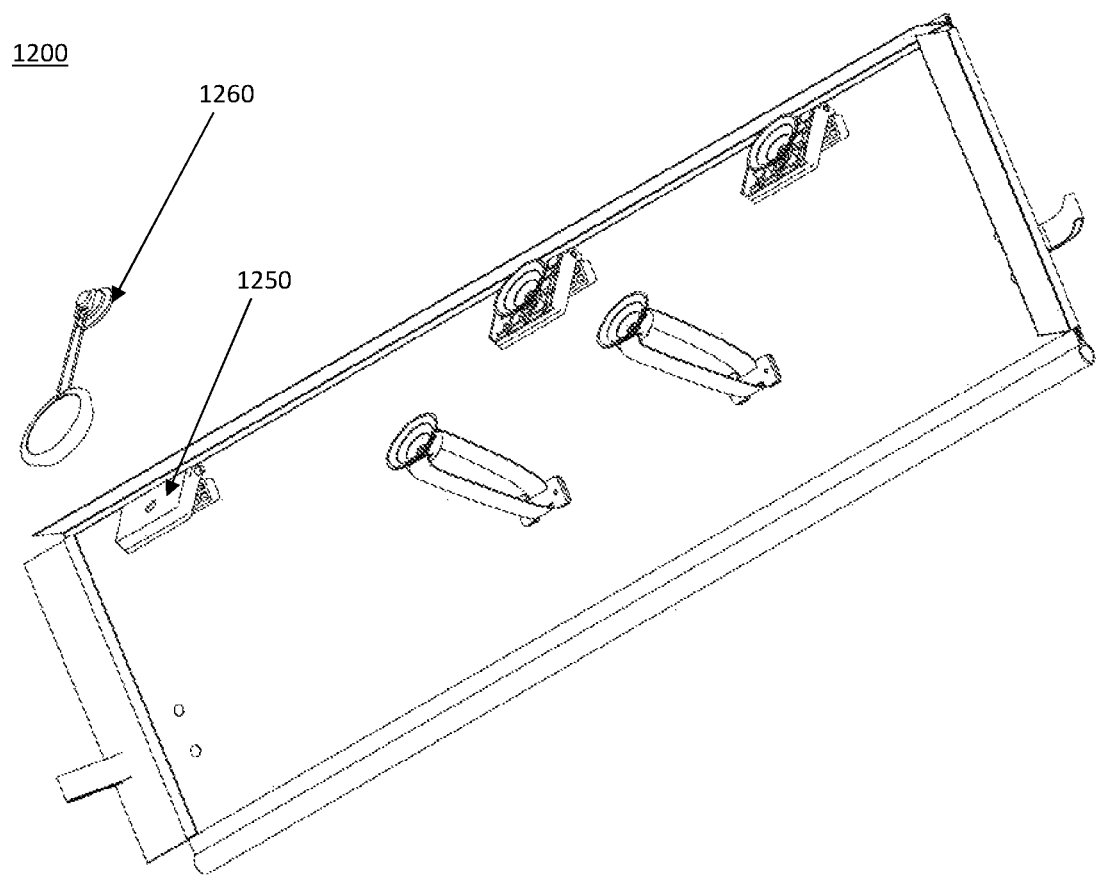
FIG. 18 shows an isometric view of a mobile panel and removable magnet holder sub-assembly according to an embodiment of the present invention.
Figure 19:
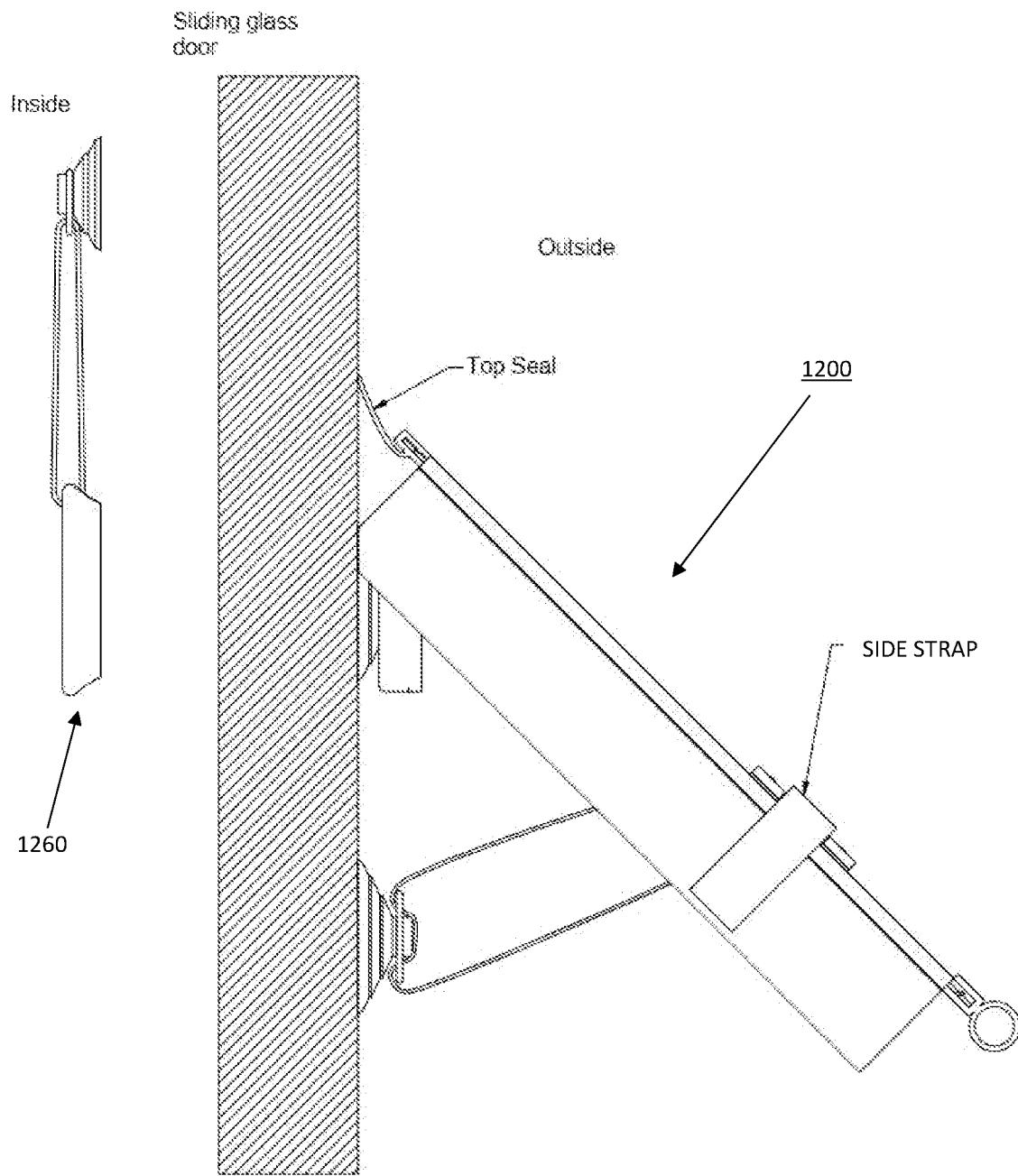
FIG. 19 shows a side view of the mobile panel and removable magnet holder sub-assembly shown in FIG. 18 as installed on a sliding glass door.
Figure 20:
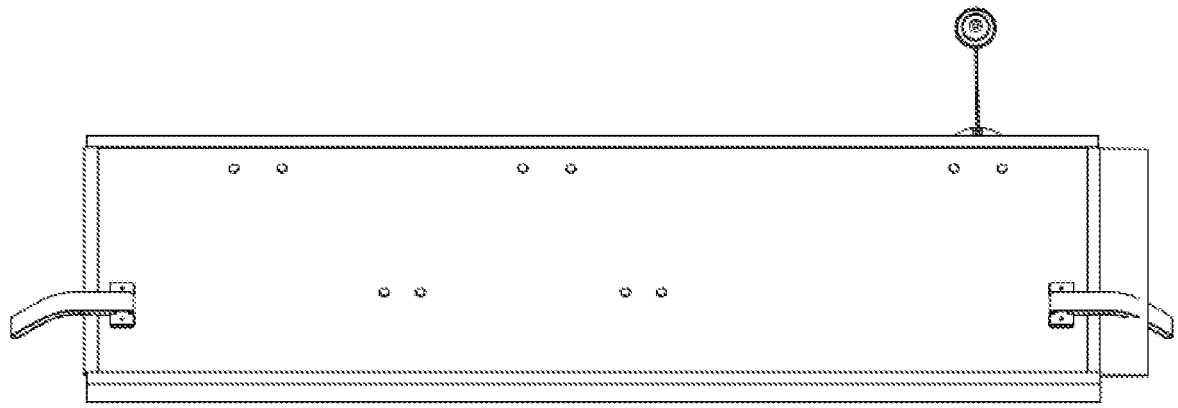
FIG. 20 shows a front view of the mobile panel and removable magnet holder sub-assembly shown in FIG. 18.
Figure 21:
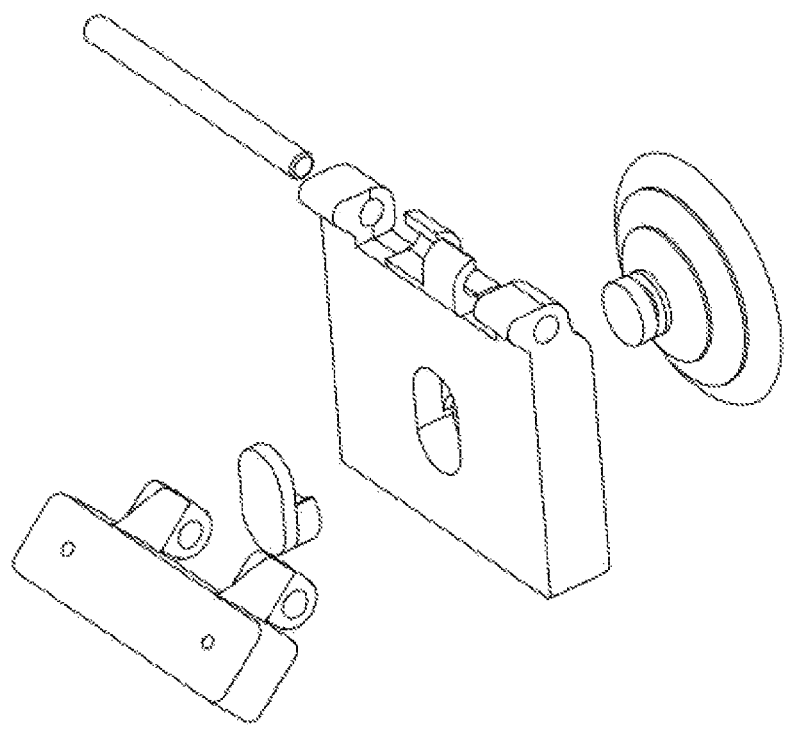
FIG. 21 shows an isometric exploded view of the squeegee holder sub-assembly.
Figure 22:
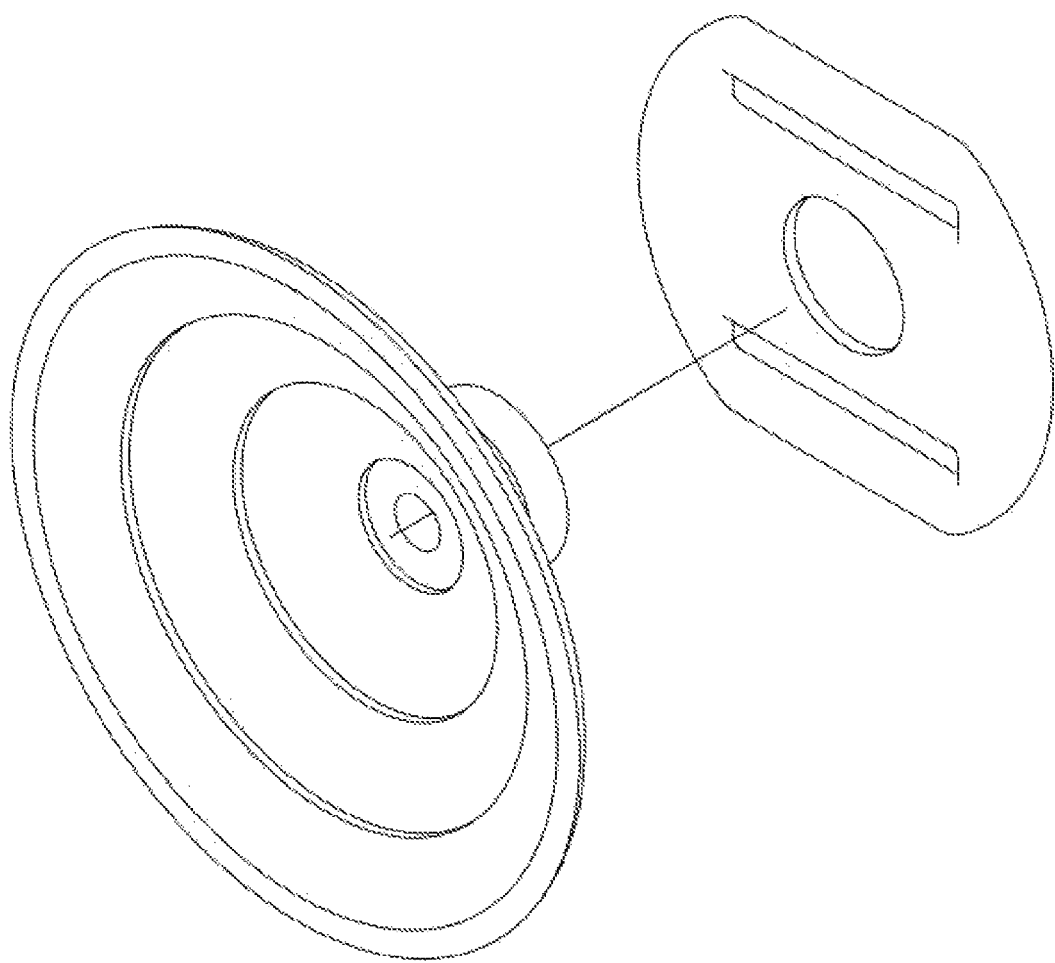
FIG. 22 shows an isometric exploded view of the suction cup hook sub-assembly.
Figure 23:
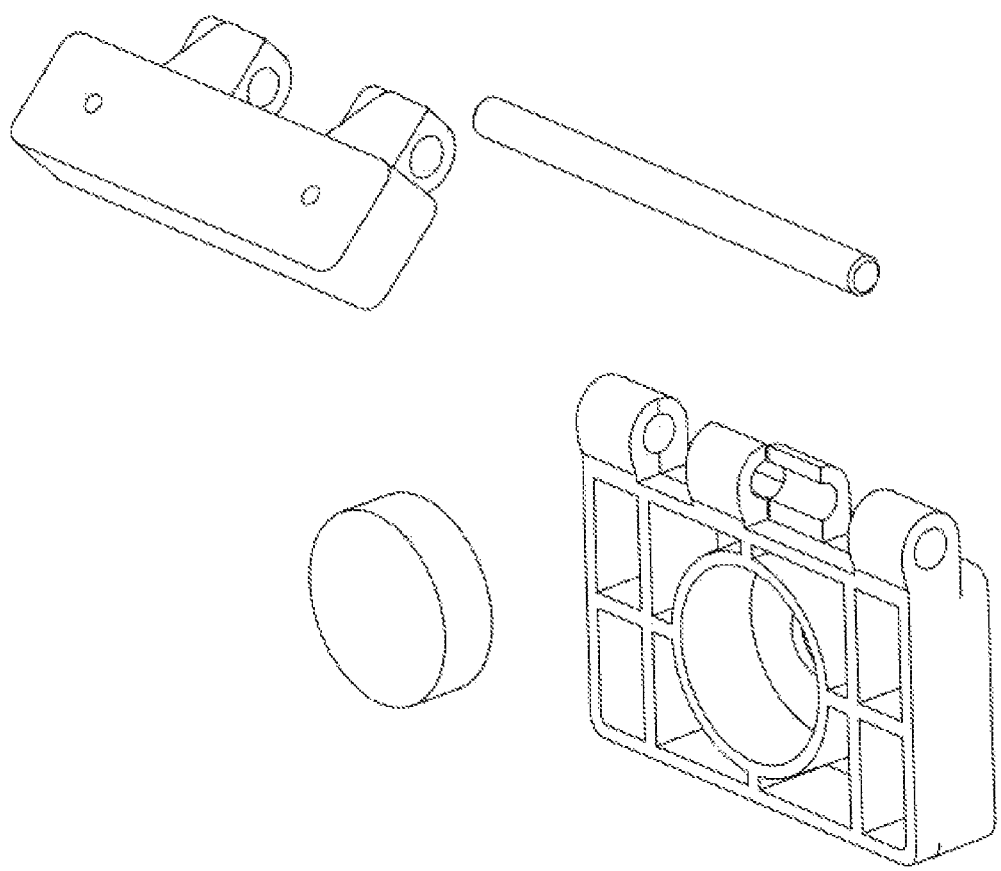
FIG. 23 shows an isometric exploded view of the magnet holder sub-assembly.
Figure 24:
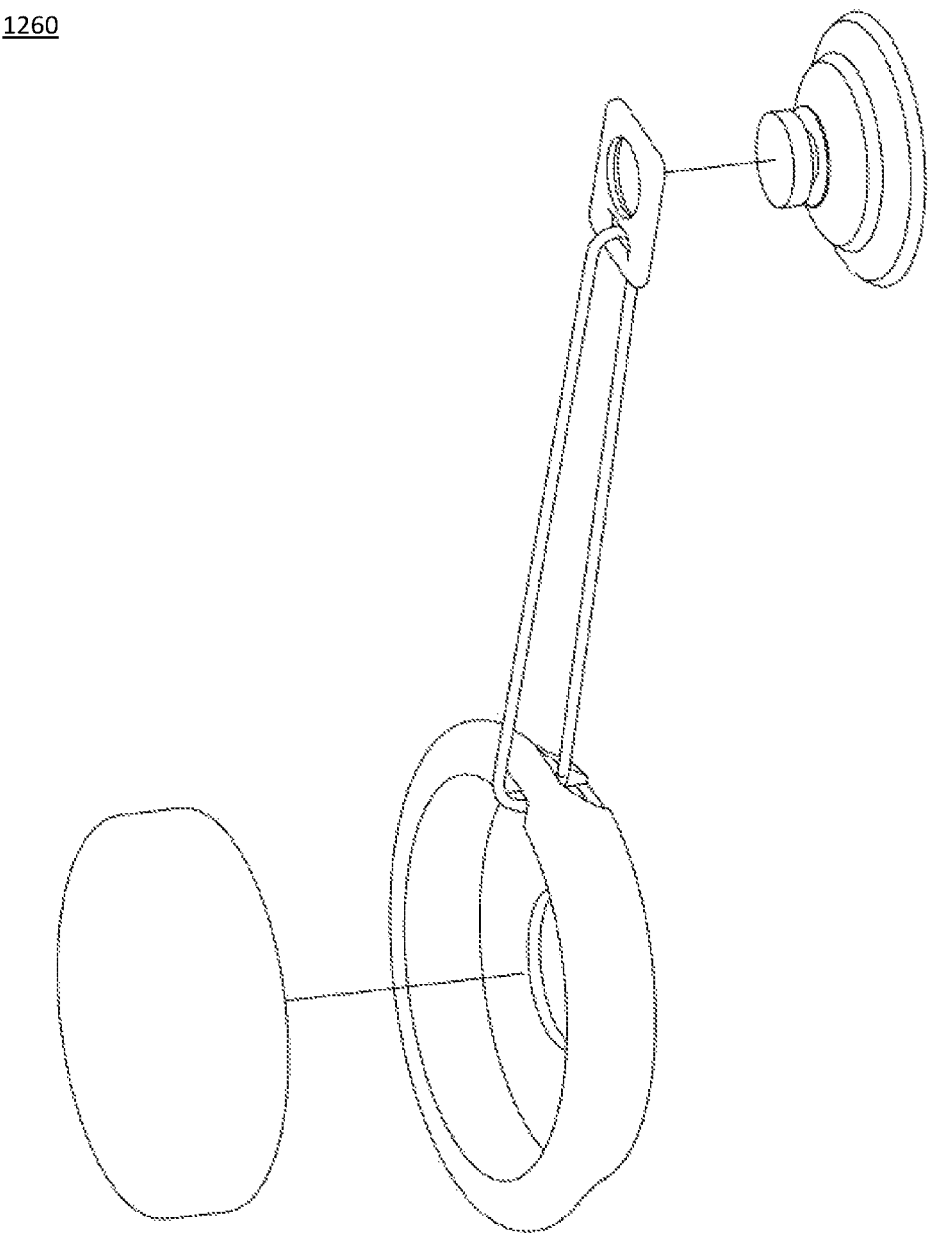
FIG. 24 shows an isometric exploded view of the removable magnet holder sub-assembly.

Referring now to FIG. 18, the mobile panel 1200 embodiment is similar in construction to the static panel 1100 and rain deflector 100. However, in addition to the upper suction cup attach components, the mobile panel 1200 utilizes one or more magnetic attach components 1250 (see FIGS. 18 and 23). Paired with a matching removable magnet holder sub-assembly 1260, the user can engage or disengage the magnetic attach component 1250 by "sandwiching" the sliding door's glass between the magnet pairs (see FIG. 19).

The magnet 1250 on the mobile panel 1200, acts in a similar manner to the suction cups 8 in that it affixes the mobile panel 1200 to the sliding door surface to create a seal. Unlike a suction cup which requires external pressure to re-engage, a magnet allows the user to close the door, and as soon as the magnets align, it will automatically create a seal without the user interacting with it. Therefore, this adds the functionality that no one needs to be outside to install the last rain deflector.

Embodiments of the present invention include a system 1000 comprising multiple rain deflectors as shown in FIGS. 9-14. For example, in an installation having a two-panel sliding glass door, one glass panel is static and the other is mobile (in sliding relation to the static panel). A system according to the present invention comprises a static panel (such as rain deflector 100 or panel 1100) that is attachable via the suction cups 8 to the glass of the static glass door panel. Additionally, a mobile panel 1200 is attached to the mobile, or sliding, glass door panel. In this case, the mobile panel 1200 is installed on the sliding glass door panel such that the one or more suction cup attach points are disposed towards the handle side (opening side) of the sliding glass door, and the one or more magnet attach points are disposed towards the junction of the sliding and static glass doors. A matching magnet pair is included respective to each of the one or more magnet attach points. Additionally, an optional wind strap is attached between the static panel and the mobile panel.

Use of the system 1000 is as follows. With the sliding glass door closed, a user attaches the static panel 1100 to the stationary glass door panel by positioning the static panel and pressing the suction cups 8 against the glass to secure the static panel 1100 securely. The user then attaches the mobile panel 1200 to the sliding glass door panel by positioning the mobile panel 1200 and pressing the suction cups 8 against the glass. The end of the mobile panel 1200 towards the static (the end with the one or more magnet attach points) panel 1100 is not fixed. An adjustable strap is connected between the two panels and its length is adjusted to remove excessive slack.

The sliding glass door is then opened to the point where the suction cup(s) of the mobile panel 1200 reaches the stationary door and impedes the sliding door from opening further. Since the main body of the mobile panel 1200 is flexible in its length, the mobile panel 1200 deflects upon contact with the frame of the stationary door and overlaps the static panel 1100 as the sliding door is open. At this point, the adjustable strap may be adjusted for length as desired.

Figure 11:
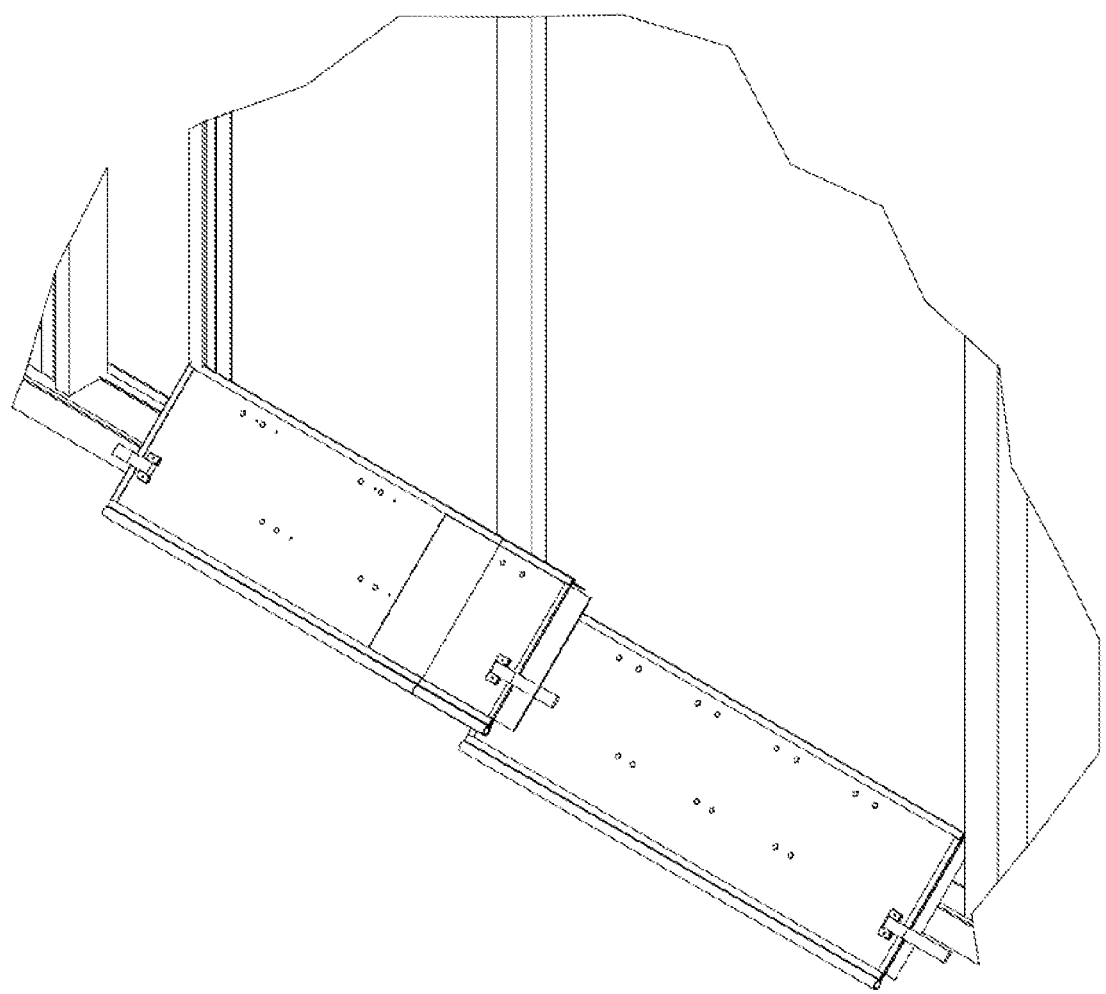
FIG. 11 shows a detail view of FIG. 10.
Figure 12:
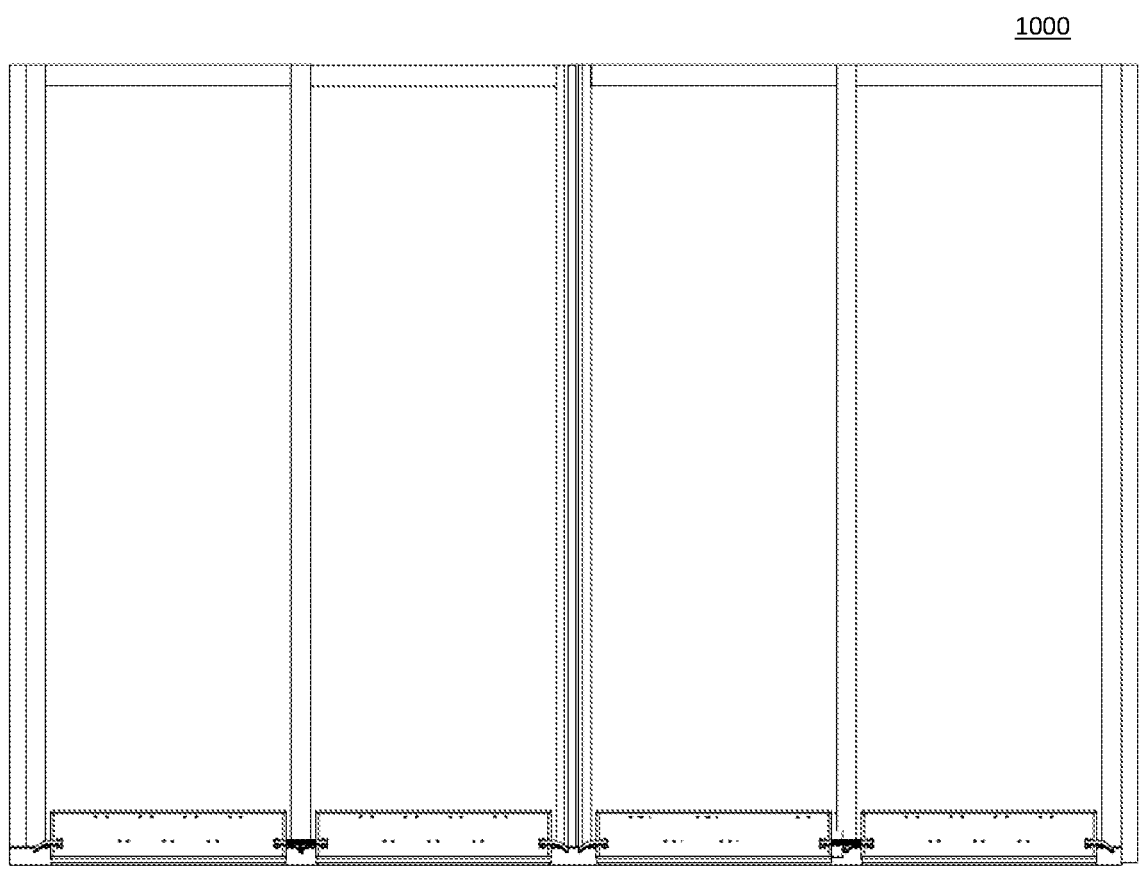
FIG. 12 shows a front view of a system embodiment of the invention shown in FIG. 9 in the closed state.
Figures 13, 14:
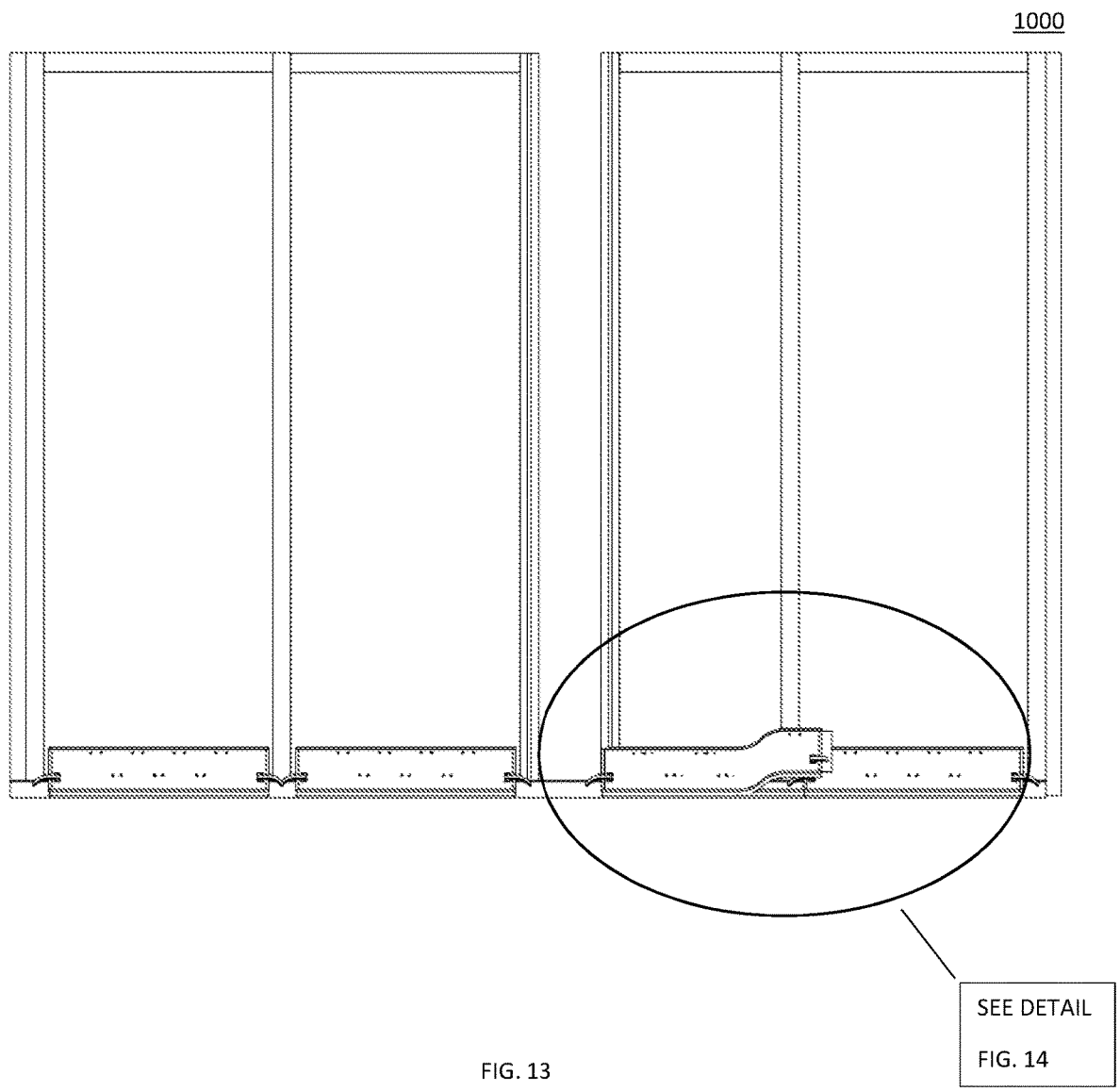
FIG. 13 shows a front view of a system embodiment of the invention shown in FIG. 9 in the open state.
FIG. 14 shows a detail view of FIG. 13.
Figure 14:
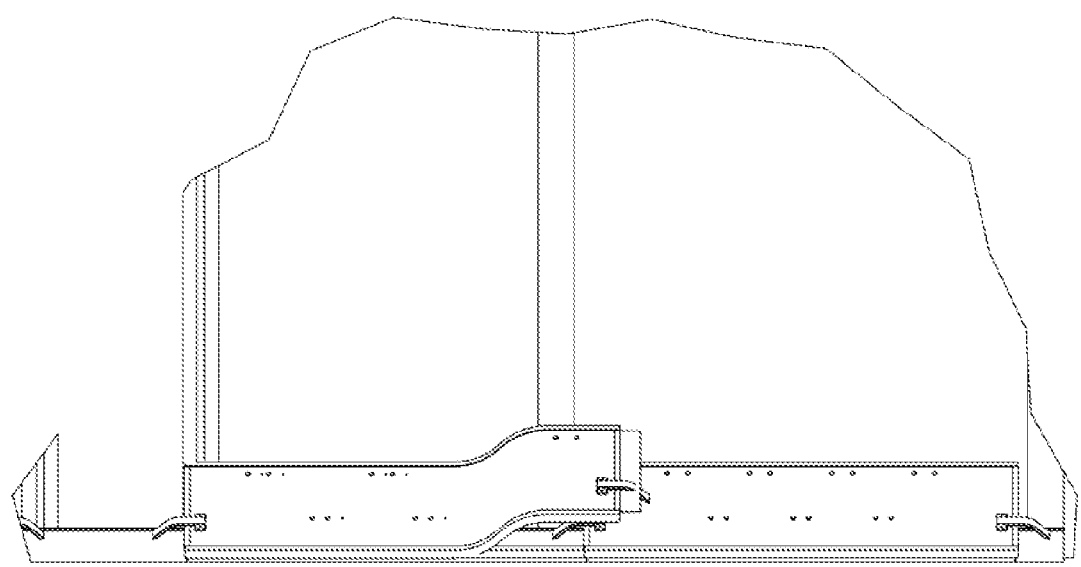

FIGS. 11 and 14 show detailed views of the sliding door open and the mobile panel 1200 in a deflected state over the next adjacent static panel 1100. The user can now enter through the sliding glass door and close it. Once closed, the mobile panel 1200 has once again slid past the stationary door frame and is now completely over the sliding glass door, however, the magnet attach points are still "free-floating." The user positions the matched-pair magnet onto the glass (on the inside) and slides it until it is in the vicinity of the magnet attach point. The magnetic force between the magnets draws the magnet attach point towards the glass and a secure attachment is achieved. In embodiments with multiple magnet attach points, this step is repeated for each one.

Releasing the mobile panel 1200 for egress through the sliding glass door is a simple matter of pulling off the one or more matched pair magnets from the interior surface of the sliding glass door, and sliding open the door.

Further embodiments of the system may also include an unattached magnet pair. This magnet pair can be attached to sandwich the sliding glass door panel, as with the magnet attach points, but, in the case of this component, the magnet pair that is on the exterior of the glass is configured to be used to push the top seal into position in the event that it was not in an optimal position upon closing the sliding glass door.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A rain deflector apparatus comprising:
    a main body that is a substantially flat sheet having a front face, a back face, and a thickness defining a top edge, a bottom edge, a right edge, and a left edge;
    a bottom seal fixedly attached to the bottom edge spanning substantially from the right edge to the left edge, where the bottom seal is a bulb seal;
    a top seal fixedly attached to the top edge spanning substantially from the right edge to the left edge; and a plurality of suction cups disposed in spaced relation on the back face adjacent to the top edge.

2. The rain deflector of claim 1 further comprising a right seal fixedly attached to the right edge spanning substantially from the top seal to the bottom seal, and/or a left seal fixedly attached to the left edge spanning substantially from the top seal to the bottom seal.

3. The rain deflector of claim 1 further comprising a one or more magnet attachment disposed in spaced relation from the plurality of suction cups on the back face adjacent to the top edge.

4. A system for diverting rain from sliding glass panels having at least one static glass panel and at least one mobile glass panel defining an inside and an outside, the system comprising:
- a static rain deflector panel configured to be attached to the outside of each of the at least one static glass panel;
- a mobile rain deflector panel configured to be attached to the outside of each of the at least one mobile glass panel;
- a magnet configured to be attached to the inside of each of the at least one mobile glass panel secured via magnetic force through the at least one mobile glass panel to the mobile rain deflector panel; and
- a one or more strap securing each of a one or more pair of adjacent static rain deflector panels or a static rain deflector panel and a mobile rain deflector panel.

* * * * *